United States Patent [19]
Park et al.

[11] Patent Number: 5,784,170
[45] Date of Patent: Jul. 21, 1998

[54] APPARATUS FOR GENERATING QUASI EQUALLY SPACED FREQUENCIES USING AN OPTICAL FREQUENCY SHIFTER IN A MULTI-CHANNEL TRANSMISSION SYSTEM

[75] Inventors: Chang Soo Park; Dong Ho Lee, both of Daejeon, Rep. of Korea

[73] Assignees: Electronics and Telecommunications Research Institute, Daejeon; Korea Telecommunication Authority, Seoul, both of Rep. of Korea

[21] Appl. No.: 646,121

[22] Filed: May 7, 1996

[30] Foreign Application Priority Data

Oct. 30, 1995 [KR] Rep. of Korea ............... 1995-38259

[51] Int. Cl.$^6$ .................................................... H04J 14/02
[52] U.S. Cl. .......................... 359/133; 359/161; 385/122
[58] Field of Search ........................ 359/133, 124, 359/125, 161, 173, 180, 181; 385/122, 24

[56] References Cited

U.S. PATENT DOCUMENTS

| | | | |
|---|---|---|---|
| 5,365,362 | 11/1994 | Gnauck et al. | 359/174 |
| 5,535,051 | 7/1996 | Basiev et al. | 359/342 |
| 5,546,210 | 8/1996 | Chraplyvy et al. | 359/124 |

OTHER PUBLICATIONS

B.S. Glance et al., "Densely Spaced FDM Coherent Star Network With Optical Signals Confined to Equally Spaced Frequencies", Journal of Lightwave Technology, vol. 6, No. 11, Nov. 1988, pp. 1770–1781.

Fabrizio Forghieri et al., "Reduction of Four-Wave Mixing Crosstalk in WDM Systems Using Unequally Spaced Channels", IEEE Photonics Technology Letters, vol. 6, No. 6, Jun. 1994, pp. 754–756.

*Primary Examiner*—Rafael Bacares
*Attorney, Agent, or Firm*—Spencer & Frank

[57] ABSTRACT

The present invention relates to an apparatus for generating quasi equally spaced multi-channel frequencies using a frequency shifter. The optical multi-channel transmission system using OFDM or WDM can be provided with quasi equally spaced(unequally sequential spaced) frequencies on the basis of the functional relation among the frequency differences($n_{ij}=n_i-n_j(i=j=1,2,3,\ldots n)$) of any two neighboring channels. Namely, after generating equally spaced frequencies by using a reference resonator, such as a Fiber Fabry Perot(FFP) resonator, each of the equally spaced frequencies is sequentially shifted by a frequency shifter, which generates and controls the quasi equally spaced (unequally sequential spaced) frequencies in order to effectively avoid crosstalk due to FFWM, and fully make use of the transmission bandwidth belonging to the low dispersion region of the optical fiber, the effect of the present invention will be apparent as follows: by easily generating and controlling quasi equally spaced frequencies having a functional relation between two adjacent channels, crosstalk due to Fiber Four Wave Mixing(FFWM) is effectively avoided, and the transmission bandwidth in the region of the low dispersion is fully utilized. Furthermore, the compatibility is easily accomplished.

7 Claims, 1 Drawing Sheet

APPARATUS FOR GENERATING QUASI EQUALLY SPACED FREQUENCIES USING AN OPTICAL FREQUENCY SHIFTER IN A MULTI-CHANNEL TRANSMISSION SYSTEM

BACKGROUND OF THE INVENTION

1. Field of the Invention

The present invention relates to an apparatus for generating quasi equally spaced(unequally sequential spaced) frequencies using a frequency shifter in the multi-channel transmission system using Optical Frequency Division Multiplexing(OFDM) or Wavelength Division Multiplexing (WDM)

2. Description of Prior Art

For the purpose of avoiding crosstalk due to Fiber Four Wave Mixing(FFWM), a multi-channel transmission system using OFDM or WDM generally adopts the method of enlarging the equally spaced frequency interval of the transmission channel, which causes the lowered efficiency of Fiber Four Wave Mixing(FFWM), or adopts the method of assigning the frequency of the transmission channel to unequal spacing, so that the frequency components caused by FFWM can be distributed outside the filtering area of the transmission channel or receiving-end.

Up to now, unequally spaced multi-channel frequencies could be generated and controlled by selectively applying the equally spaced transmission characteristic of the reference resonator.

However, the above-mentioned existing method has the problem of generating and controlling multi-channel frequencies in that a wide transmission bandwidth is required for frequency differences($n_{ij}=n_i-n_j(i=j=1,2,3,\ldots n)$) of any two neighboring channels in order to have a different value, and the transmission characteristic of the reference resonator should be selectively applied because the frequency difference($n_{ij}=n_i-n_j(i=j=1,2,3,\ldots n)$) of any two neighboring channels has no functional relation to each other.

SUMMARY OF THE INVENTION

Accordingly, the present invention is intended to deal with the foregoing problem, and its objective is to provide an apparatus for generating quasi equally spaced multi-channel frequencies using a frequency shifter, by which the optical multi-channel transmission system using OFDM or WDM can be provided with quasi equally spaced(unequally sequential spaced) frequencies on the basis of the functional relation among the frequency differences($n_{ij}=n_i-n_j(i=j=1, 2,3,\ldots n)$) of any two neighboring channels. Namely, after generating equally spaced frequencies by using a reference resonator, such as a Fiber Fabry Perot(FFP) resonator whose transmission characteristic is based on equal spacing, each of the equally spaced frequencies is sequentially shifted by a frequency shifter, which generates and controls the quasi equally spaced(unequally sequential spaced) frequencies in order to effectively avoid crosstalk due to FFWM, and fully make use of the transmission bandwidth belonging to the low dispersion region of the optical fiber.

To accomplish the above-mentioned objective, the present invention comprises:

- a multi-channel light source means for generating a plurality of equally spaced optical frequencies;
- a first optical coupling means for splitting the optical frequency signals transmitted from the multi-channel light source means and for transmitting the splitted signals;
- a second optical coupling means for combining a plurality of outputs of the first optical coupling means and for transmitting the multiplexed signal;
- a reference resonating means for outputting the error signals resulting from the variation of the optical frequencies transmitted from the second optical coupling means and for transmitting the signals;
- an optical frequency stabilizing means for controlling the temperature of the multi-channel light source means and the input current which will be sent to the multi-channel light source means after detecting the variation of the optical frequency applied from the reference resonating means;
- a frequency multiplying means for multiplying a certain external frequency $\Delta f_{sh}$ by a predetermined integer and for transmitting the multiplied frequency signal;
- a frequency shifting means for transmitting a plurality of optical frequency signals having respective frequency shifts $\Delta f_{sh}$ after receiving the output of the first optical coupling means and the frequency multipling means;
- a modulating means for modulating an optical frequency signal transmitted from the first optical coupling means and a plurality of optical frequency signals transmitted from the frequency shifting means by an external modulating signal; and
- a third optical coupling means for multiplexing a plurality of optical frequency signals modulated by the modulating means and for externally transmitting the modulated signals.

DETAILED DESCRIPTION OF THE PREFERRED EMBODIMENT

Figure 1:
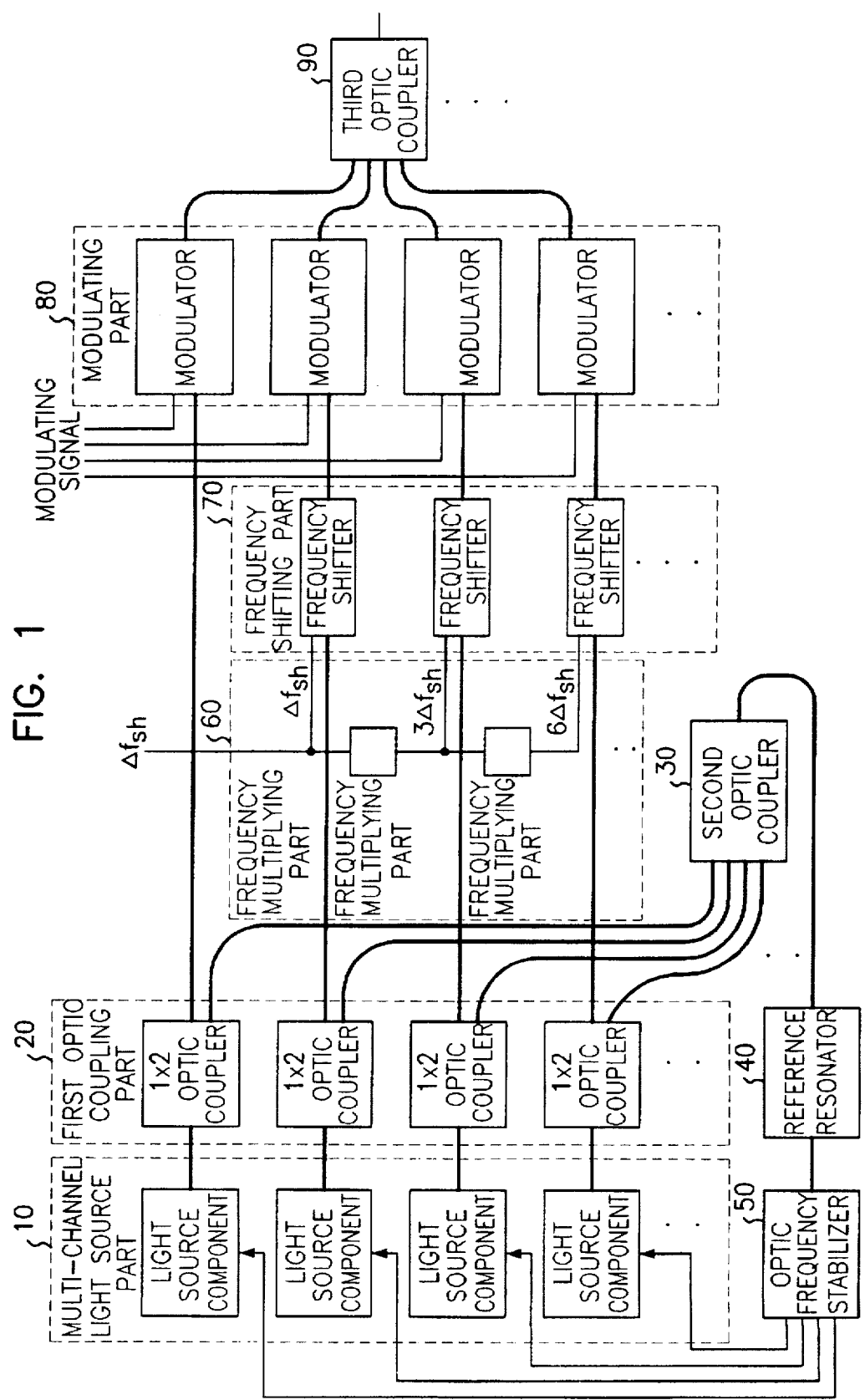
FIG. 1 is a configuration view of an apparatus for generating quasi equally spaced frequencies in a multi-channel system in accordance with the present invention.

The present invention will be described with reference to the preferred embodiment illustrated in the accompanying drawing.

FIG. 1 is a configuration view of an apparatus for generating quasi equally spaced frequencies using a frequency shifter in a multi-channel transmission system in accordance with the present invention.

It illustrates the multi-channel light source part 10, the first optical coupling(splitting) part 20, the second optical coupling part 30, the reference resonating part 40, the optical frequency stabilizing part 50, the frequency multiplying part 60, the frequency shifting part 70, the modulating part 80 and the third optical coupling part 90.

The multi-channel light source part 10, composed of a plurality of light source components, generates a plurality of optical frequency signals which are distributed with the equal spacing $\Delta f_c$, respectively, and then transmits them to the first optical coupling part 20.

The first optical coupling part 20, composed of a plurality of 1×2 optical couplers, splits the output of the multi-channel light source part 10 and then transmits the splitted signals.

The second optical coupling part 30, composed of N×1 optical coupler, multiplexes a plurality of optical frequency signals applied from the first optical coupling part 20, and then transmits the multiplexed signal into the reference resonating part 40.

The reference resonating part 40 is composed of a Fiber Fabry-Perot(FFP) resonator whose peak transmission appears at the equally distributed resonant frequencies. Accordingly, in case the optical frequency applied from the third optical coupling part 30 varies, the reference resonating part 40 makes its own output varying and then transmits the varied output into the optical frequency stabilizing part 50.

The optical frequency stabilizing part 50 controls the temperature of the multi-channel light source part 10 and the input current which will be sent to the multi-channel light source part 10 after detecting the variation of the optical frequency applied from the reference resonating part 40.

Therefore, due to the mutual operation between the reference resonating part 40 and the optical frequency stabilizing part 50, the multi-channel light source part 10 generates a stable frequency with equal spacing. On the other hand, one of the two splitted outputs of the first optical coupling part 20 is transmitted keeping the stable frequency characteristic and the equal spacing $\Delta f_c$.

The first 1×2 optical coupler inside the first optical coupling part 20 transmits one of the splitted outputs into the modulating part 80 while the others transmit one of their splitted outputs into the frequency shifting part 70.

The frequency shifting part 70 is composed of a plurality of frequency shifters. Each frequency shifter increases or decreases the applied optical frequency with a variation as much as $\Delta f_{sh}$, provided that a certain frequency $\Delta f_{sh}$ signal is applied. At this time, the frequency $f_{sh}$ signal is supplied by way of the frequency multiplying part 60.

The frequency multiplying part 60 is composed of a plurality of frequency multipliers which multiply a certain external frequency $f_{sh}$ by a predetermined integer and then transmit the multiplied frequency signal into the frequency shifter of the frequency shifting part 70.

Therefore, the optical frequency, which passes through each frequency shifter, is sequentially increased or decreased as much as the external applied frequency $\Delta f_{sh}$.

The method for setting the multi-channel frequency in accordance with the present invention is as follows:

The frequency of each channel, $f_i$ complies with the following equation.

$$f_i = f_o \pm i \cdot \Delta f_c \pm \left( \sum_{k=0}^{i} k - i \right) \cdot \Delta f_{sh}$$

$(i = 0,1,2,3, \ldots, N)$;

wherein the reference frequency $f_o$ corresponds to the upper frequency $f_h$ or lower frequency $f_l$ of the transmission bandwidth in the multi-channel(N-channel) transmission system adopting Optical Frequency Division Multiplexing (OFDM) or Wavelength Division Multiplexing(WDM), $\Delta f_c$ is the frequency spacing given by the resonator, and $\Delta f_{sh}$ ($<\Delta f_c$) corresponds to the value which makes the frequency spacing varied.

Hence, the frequency difference $\Delta f_i$ between two neighboring channels is $$\Delta f_i = f_{i+1} - f_i = \Delta f_c - i \cdot \Delta f_{sh}$$

Therefore, the frequency is sequentially increased or decreased with quasi equal spacing as follows:

$$\Delta f_c - N \cdot \Delta f_{sh}, \Delta f_c - (N-1) \cdot \Delta f_{sh}, \ldots, \Delta f_c - 3\Delta f_{sh}, \Delta f_c - 2\Delta f_{sh}, \Delta f_c - \Delta f_{sh}, \Delta f_c$$

or $$\Delta f_c, \Delta f_c + \Delta f_{sh}, \Delta f_c + 2\Delta f_{sh}, \Delta f_c 30\ 3\Delta f_{sh}, \ldots, \Delta f_c + (N-1) \cdot \Delta f_{sh}, \Delta f_c + N \cdot \Delta f_{sh}$$

Thus, the quasi equally spaced(unequally sequential spaced) multi-channel frequency can be stably generated and be effectively controlled by sequentially increasing or decreasing the frequency spacing with the help of each frequency shifter which receives the equally spaced($\Delta f_c$) frequencies.

In turn, the quasi equally spaced optical frequency generated by each frequency shifter is applied to the modulating part 80 which is composed of a plurality of modulators. The first modulator within the modulating part 80 modulates the optical frequency signal, which is transmitted from the first 1×2 optical coupler inside the first optical coupling part 20, by the external modulating signal. On the other hand, other modulators modulates the optical frequency signal transmitted from the frequency shifting part 70. The modulated signal is then transmitted into the third optical coupling part 90.

The third optical coupling part 90 is composed of an N×1 optical coupler and multiplexes the optical frequency signal modulated by the modulating part 80.

Accordingly, as mentioned so far, the effect of the present invention will be apparent as follows:

By means of easily generating and controlling quasi equally spaced frequencies having a functional relation between two adjacent channels, crosstalk due to Fiber Four Wave Mixing(FFWM) is effectively avoided, and the transmission bandwidth in the region of the low dispersion is fully utilized. Furthermore, the compatibility is easily accomplished.

While the present invention has been disclosed in connection with the preferred embodiment thereof, it should be understood that there may be other embodiments which fall within the spirit and scope of the invention as defined by the following claims.

What is claimed:

1. Apparatus for generating quasi equally spaced multi-channel frequencies, comprising:

a multi-channel light source means for generating a plurality of equally spaced optical frequencies;

a first optical coupling means for splitting the optical frequency signals transmitted from the multi-channel light source means and for transmitting the splitted signals;

a second optical coupling means for combining a plurality of outputs of the first optical coupling means and for transmitting the multiplexed signal;

a reference resonating means for outputting the error signals resulting from the variation of the optical frequencies transmitted from the second optical coupling means and for transmitting the signals;

an optical frequency stabilizing means for controlling the temperature of the multi-channel light source means and the input current which will be sent to the multi-channel light source means after detecting the variation of the optical frequency applied from the reference resonating means;

a frequency multiplying means for multiplying a certain external frequency $\Delta f_{sh}$ by a predetermined integer and for transmitting the multiplied frequency signal;

a frequency shifting means for transmitting a plurality of optical frequency signals having respective frequency shifts $\Delta f_{sh}$ after receiving the output of the first optical coupling means and the frequency multipling means;

a modulating means for modulating an optical frequency signal transmitted from the first optical coupling means and a plurality of optical frequency signals transmitted from the frequency shifting means by an external modulating signal; and a third optical coupling means for multiplexing a plurality of optical frequency signals modulated by the modulating means and for externally transmitting the modulated signals.

2. Apparatus for generating quasi equally spaced multi-channel frequencies in accordance with claim 1, wherein said multi-channel light source means comprises a plurality of light source components and generates a plurality of optical frequency signals which are distributed with equal spacing $\Delta f_c$, respectively.

3. Apparatus for generating quasi equally spaced multi-channel frequencies in accordance with claim 1, wherein said first optical coupling means comprises a plurality of 1×2 optical couplers and splits the output of said multi-channel light source means and then transmits the splitted signals.

4. Apparatus for generating quasi equally spaced multi-channel frequencies in accordance with claim 1, wherein said reference resonating means comprises a Fiber Fabry-Perot(FFP) resonator.

5. Apparatus for generating quasi equally spaced multi-channel frequencies in accordance with claim 1, wherein said frequency multiplying means comprises a plurality of frequency multiplying circuits which multiply a certain external frequency $\Delta f_{sh}$ by a predetermined integer and then transmits the multiplied frequency signals.

6. Apparatus for generating quasi equally spaced multi-channel frequencies in accordance with claim 1, wherein said frequency shifting means comprises a plurality of frequency shifters.

7. Apparatus for generating quasi equally spaced multi-channel frequencies in accordance with claim 1, wherein said modulating means comprises a plurality of modulators.

* * * * *